(12) United States Patent
Giraudet

(10) Patent No.: US 8,192,021 B2
(45) Date of Patent: Jun. 5, 2012

(54) MULTI-TINT OPHTHALMIC LENSES FOR NIGHT VISION

(75) Inventor: Guillaume Giraudet, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 128 days.

(21) Appl. No.: 12/514,565

(22) PCT Filed: Nov. 15, 2007

(86) PCT No.: PCT/FR2007/052346
§ 371 (c)(1),
(2), (4) Date: Dec. 21, 2009

(87) PCT Pub. No.: WO2008/059177
PCT Pub. Date: May 22, 2008

(65) Prior Publication Data
US 2011/0141434 A1   Jun. 16, 2011

(30) Foreign Application Priority Data
Nov. 17, 2006   (FR) ..................... 06 10097

(51) Int. Cl.
*G02C 7/10* (2006.01)
(52) U.S. Cl. ......... 351/165; 351/162; 351/163; 351/164
(58) Field of Classification Search ........... 351/162–165
See application file for complete search history.

(56) References Cited

U.S. PATENT DOCUMENTS

| | | | | |
|---|---|---|---|---|
| 3,628,854 A | * | 12/1971 | Jampolsky | .................. 351/175 |
| 5,428,409 A | | 6/1995 | Siverstein | |
| 2004/0119940 A1 | | 6/2004 | Kerns et al. | |
| 2005/0143812 A1 | * | 6/2005 | Paul et al. | ....................... 623/6.3 |

FOREIGN PATENT DOCUMENTS

| | | |
|---|---|---|
| DE | 4327193 | 2/1995 |
| DE | 29716010 | 11/1997 |
| FR | 2684771 | 6/1993 |

* cited by examiner

*Primary Examiner* — Darryl J Collins
(74) *Attorney, Agent, or Firm* — Occhiuti Rohlicek & Tsao LLP

(57) ABSTRACT

The present invention relates to an ophthalmic lens comprising, on its surface, a first central yellow zone preferentially absorbing the blue light of the visible spectrum, a second peripheral zone preferentially absorbing light having wavelengths of less than 600 nm, and preferentially a third zone which is colorless, grey, or brown in the lower part of the lens.

12 Claims, 1 Drawing Sheet

MULTI-TINT OPHTHALMIC LENSES FOR NIGHT VISION

CROSS-REFERENCE TO RELATED APPLICATIONS

This application is the National Stage of International Application No. PCT/FR2007/052346, filed on Nov. 15, 2007, which claims the priority of French Application No. 0610097, filed on Nov. 17, 2006, the contents of both of the foregoing applications are hereby incorporated by reference in their entirety.

BACKGROUND

The present invention relates to the field of the colouration of ophthalmic lenses. More particularly, the invention relates to a novel design for the multi-tint colouration of ophthalmic lenses.

Within the meaning of the invention, by "ophthalmic lenses" is meant corrective and non-corrective lenses and also masks and other vision devices intended to be worn in front of the eyes.

The structures involved in vision are well known: these are the photoreceptors of the retina of the eye, namely the cones and the rods, which are responsible for the conversion of light energy into nerve impulses. The cones have a threshold of sensitivity to bright light, contain three different pigments (blue, green, red) and are therefore sensitive to colours, and make it possible to distinguish details: they are therefore suited to daytime vision. Conversely, the rods possess a very low light detection threshold (one photon) and are suited to night vision.

When the eye is suited to a low-light environment, it is mainly, or even solely, the rods which ensure the acquisition of visual information. This adaptation of the retina to darkness, linked to a phenomenon of rhodopsin regeneration, is optimum on average after 20-30 minutes spent in total darkness. The more prolonged this adaptation of the retina to darkness, the more immediate its loss of adaptability: a brief glare will immediately cause saturation of the rods situated in the zone exposed to the glare, and the recovery of the eye's maximum night vision capacities, in this zone, by a slow rhodopsin regeneration will require at least another twenty minutes.

The rods, numbering approximately 120 million in total, are situated in the peripheral zone of the retina surrounding a central zone, approximately 4 mm in diameter, called the macula and constituted exclusively by cones.

Driving a vehicle is a multisensory task in which the information picked up by the eye is essential for the driver to reach a prompt and appropriate decision. Under difficult visual conditions, during night driving for example, this activity becomes more difficult and the risks of accidents are higher.

Several needs have thus been identified by the applicant to optimize night vision and therefore improve the driver's comfort and safety.

Firstly, it is necessary to obtain effective protection against glare, in order to maintain so far as possible the adaptation of the retina to darkness. Glare phenomena, which are frequent during night driving, associated for example with the headlights of vehicles coming in the opposite direction or being reflected in the rear-view mirrors, are due more to the great difference between the intensity of the dazzling light and the eye's level of adaptation to darkness than to the intrinsic value of the intensity of the light source. In other words, the same headlights causing a nuisance at night will have only a slight effect in the daytime, the retina being already accustomed to seeing bright objects.

The rods, sensitive to wavelengths between 450 nm and 530 nm, are practically not stimulated by a source of red or orange light (wavelengths greater than 600 nm). The protection of the eyes by a red or orange filter almost exclusively allowing light of wavelengths greater than 600 nm to pass through should thus make it possible to prevent rhodopsin degradation and to maintain the adaptation of the eye to darkness.

Secondly, it is necessary for the driver to be aware of his environment, such as for example road signs, in a detailed and contrasted manner. Numerous works have shown that yellow filters, selectively cutting out the short wavelengths (i.e. the blue light), improve sensitivity to contrast. Such filters are in particular described in Wolffsohn et al., *Optometry and Vision Science*, volume 77(2), pages 73-81, (2000). The works of Wolffsohn show that cutting out the short wavelengths with yellow filters increases contrast perception, in particular when viewing luminous objects against an overall blue background.

It would thus be desirable to have spectacles with lenses providing both effective protection against glare and the subsequent degradation of the rhodopsin of the rods, and an improvement in the perception of contrasts by filtering out of blue light with a short wavelength.

Several patents describe lenses comprising a grey or dark zone on part of their surface making it possible to reduce the glare produced by vehicle headlights or external lights which are too strong. Such lenses are described in GB 277167, JP 9005681 and DE 19650122. These patents correspond partially to just one of the needs of night vision, protection against glare: the grey tint reduces the overall level of transmission of the light rays but does not specifically filter out the rays responsible for the phenomenon of the eyes' loss of adaptability, namely the light rays having wavelengths of less than 600 nm.

U.S. Pat. No. 5,428,409 describes spectacles for night driving comprising a glare-reducing dark-tinted zone situated in the upper quarter of the spectacle lens and a light-transmission zone, optionally coloured yellow, covering the remainder of the surface of the lens.

FR2684771 proposes a double-tint solution. An "iridescent violet or derivatives" colour in the top part of the lens and a yellow tint in the bottom part of the lens for clear and contrasted vision. The teaching of this prior art is however equivocal. In fact, this document claims that the violet zone in the upper part of the lens selectively allows the red light (with a long wavelength) to pass through. Now, it is known that the violet radiation, by contrast, is radiation with a short wavelength (approximately 400 nm) to which the rhodopsin of the rods is very sensitive. Moreover, in this document the "anti-glare" zone is present only in the upper half of the lens and cannot therefore protect all of the rods distributed over the entire peripheral zone of the retina. On the other hand, the yellow tint is limited to the lower part of the lens and does not therefore make it possible to improve sensitivity to contrast for the perception of objects situated, in terms of far vision, straight ahead of the driver, such as road signs or obstacles to be avoided on the carriageway, or only at the cost of a significant and uncomfortable change in the position of head.

None of the documents of the prior art, to the applicant's knowledge, therefore describes ophthalmic lenses which are perfectly suited to night vision, i.e. lenses making it possible both to protect the rods situated on the periphery of the retina against exposure to wavelengths less than approximately 600 nm and to improve the perception of contrasts in the zone of the lens covered by the view and passed through by the light rays which arrive at the cone-rich macula.

SUMMARY

Thus, the present invention proposes to respond to a double technical problem posed by night vision: obtaining effective protection against glare and improving the perception of contrasts.

This double problem has been solved according to the present invention thanks to lenses comprising both a yellow-coloured zone, corresponding essentially to the zone of the lens explored by the view of the user, and a red or orange-coloured zone surrounding the yellow zone, i.e. situated at the periphery of the lens and generally not covered by the view of the user. Whilst the yellow colour in the central vision zone of the lens plays the well-known role of improving sensitivity to contrast, the red or orange colour outside the central vision zone filters out rays with short wavelengths, less than 600 nm, and thus prevents the deactivation of the rhodopsin of the rods and the loss of the eye's adaptability to darkness.

As a result a subject of the present invention is an ophthalmic lens, characterized in that it comprises, on its surface,
 a yellow-coloured central zone, preferentially absorbing the blue light of the visible spectrum, and
 a red or orange-coloured peripheral zone, preferentially absorbing the wavelengths of less than 600 nm of the visible spectrum.

The adjective "central" used to describe the yellow-coloured zone does not signify that this zone occupies a position corresponding to the geometric centre of the ophthalmic lens according to the invention. It simply expresses the fact that this zone of the lens is not in contact with the periphery of the ophthalmic lens but is circumscribed by the red or orange-coloured peripheral zone. When the ophthalmic lens comprises one or more optical centres, the yellow-coloured central zone is generally centred around this optical centre or each of these optical centres.

By "ophthalmic lenses" within the meaning of the invention is meant afocal non-corrective lenses, but also monofocal corrective lenses and progressive lenses.

DETAILED DESCRIPTION

In an embodiment of the invention, the ophthalmic lens is an afocal ophthalmic lens. In this embodiment, and for this type of non-corrective lens, the yellow-coloured central zone preferably has a circular or oval shape.

In another embodiment of the invention, the ophthalmic lens is a monofocal corrective ophthalmic lens. In this type of lens, the yellow-coloured central zone, preferably circular or oval, is generally centred on the optical centre of the lens.

Figure 1:
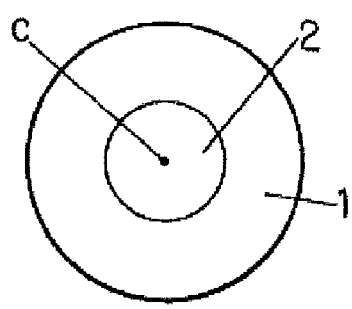
FIG. 1 is an embodiment of a monofocal ophthalmic lens.
Figure 2:
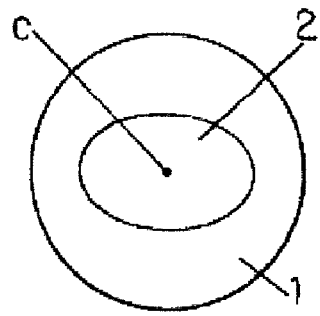
FIG. 2 is another embodiment of a monofocal ophthalmic lens.

FIGS. 1 and 2 represent such monofocal lenses comprising a red or orange peripheral zone 1 surrounding a yellow-coloured central zone 2, circular or oval in shape, centred around the optical centre C of the lens.

Advantageously, the diameter of the yellow-coloured circular zone, or the largest dimension of the yellow-coloured oval zone, is comprised between 5 and 35 mm, preferably between 10 and 25 mm, and is in particular approximately 20 mm.

In addition to the afocal and monofocal lenses, the present invention can apply to other types of lenses, in particular the progressive lenses. This type of lens is remarkable in that it has two optical centres, i.e. a far vision optical centre and a near vision optical centre, linked by a progression corridor which allows the eye to pass gently from far vision to near vision, thus providing true visual comfort for the wearer.

Figure 3:
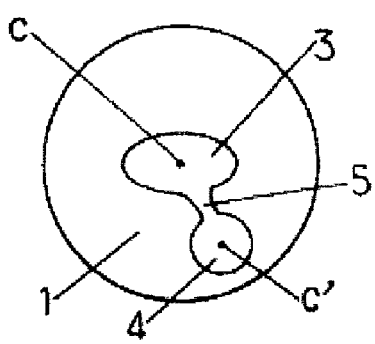
FIG. 3 is an embodiment of a progressive corrective ophthalmic lens.

A subject of a particular embodiment of the invention is therefore a progressive corrective ophthalmic lens with a far vision optical centre and a near vision optical centre. In the case of such a lens represented in FIG. 3, the yellow-coloured central zone comprises a first zone 3, preferably circular or oval in shape, essentially covering the zone around the far vision optical centre C, and a second zone 4, preferably circular or oval in shape, covering the zone around the near vision optical centre C', as well as a band 5 linking these two zones and corresponding to the path followed by the eye when it passes from one to the other. This band corresponds, in other words, to the abovementioned "progression corridor". The remainder of the surface of the lens is covered by the red or orange zone 1.

In the case of a progressive corrective ophthalmic lens, the diameter or the largest dimension of the yellow-coloured central zone covering the far vision optical centre is preferably comprised between 5 and 35 mm, in particular between 10 and 25 mm, and still more preferably approximately 20 mm.

The yellow zone covering the near vision optical centre is generally smaller than that corresponding to the far vision optical centre. The diameter or the largest dimension of the yellow-coloured central zone covering the near vision optical centre is advantageously comprised between 5 and 15 mm, preferably between 7 and mm, and is in particular approximately 10 mm. The width of the band linking these two zones is advantageously comprised between 3 and 7 mm, preferably between 4 and 6 mm, and is in particular approximately 5 mm.

The dimensions of the yellow-coloured central zone indicated above correspond to the ranges appropriate for most wearers of spectacles, but do not take account of individual differences. It will easily be understood that it is advantageous to limit so far as possible the dimension of the yellow-coloured central zone to that of the zone actually explored by the human eye in order to maximize the extent of the red or orange zone ensuring the protection against glare of the peripheral zones of the retina. Such an optimization of the relative dimensions of the yellow and red or orange zones can be carried out for example using the Vision Print System (VPS) technology developed by the applicant within the context of other research into visual behaviour. This involves a device making it possible to describe the interindividual differences in eye-head coordination strategy in the visual exploration of the environment, also called "eye-head behaviour". It is thus possible to define, on the one hand, individuals who are "head movers" having a tendency to follow an object visually by a movement of the head rather than by a movement of the eye, and, on the other hand, individuals who are "eye movers" having a tendency to follow an object visually by a movement of the eyes rather than with the head.

Determination of the eye-head behaviour of a wearer of spectacles thus makes it possible to optimize the size of the yellow-coloured central zone. If the wearer has a tendency to turn their head rather than their eyes to follow an object by sight, a yellow filter of 5 to 20 mm is generally sufficient to cover the whole vision zone of the lens. Conversely, if the wearer has a tendency to move their eyes rather than their head to follow an object by sight, then a yellow filter covering a relatively wide zone of the lens is necessary, for example a zone having a diameter comprised between 20 and 35 mm.

The red or orange peripheral zone is not necessarily adjacent to the yellow-coloured central zone and can in principle be separated from the latter by a colourless band. However, for the purpose of maximizing the effectiveness of protection against glare, the red or orange-coloured peripheral zone of the ophthalmic lens of the invention preferably covers the whole surface not covered by the yellow-coloured central zone.

A particular embodiment of the multi-tint ophthalmic lenses of the present invention makes it possible to solve an additional technical problem which has not yet been tackled until now.

In fact, night driving generally requires access to a quantity of information displayed in the vehicle's passenger compartment, relating to the driving parameters (speed, rev. count, etc.), navigation (screen of a GPS system for example) as well as other displays not specifically linked to driving (time, car radio, etc.). These different components have display colours which vary from one passenger compartment to another and can be monochromatic or polychromatic. Having a yellow filter on the surface of a lens can cause a general problem with perception of colours (De Fez et al., *Optometry and Vision Science*, volume 79(9), pages 590-7, (2002)) and in particular with displays present in a vehicle's passenger compartment.

Recommending a tinted lens could thus prove detrimental to the quality of visualization of certain displays, if the light that they emit comes partly or wholly within the absorption spectrum of the lens. For example, the route to be followed displayed in yellow on the screen of a GPS system would no longer be visible with a yellow filter. It would therefore be preferable to provide no particular tint or a neutral tint in the part of the lens used for observing the different displays in the vehicle.

In order to solve this additional problem posed by the perception of displays which are predominantly yellow in the vehicle's passenger compartment, the ophthalmic lenses of the present invention, in a preferred embodiment, comprise an untinted zone or a neutral-tinted zone, for example brown or grey in colour. This colourless or neutral-coloured zone clearly does not have to be situated in the zone of the lens explored by the eye when the wearer of spectacles looks into the distance, outside the vehicle, but on the contrary in the zone explored by the view of the driver in close vision. As a result, in a preferred embodiment of the ophthalmic lenses of the present invention, at least in one part of the zone explored by the user's eye in close vision, the yellow and/or red or orange colour is absent or replaced by a grey or brown colour.

The location of this colourless or neutral-coloured zone varies of course as a function of the type of lens, i.e. as a function of the presence, number and location of any optical centres.

Thus, when the ophthalmic lens of the present invention is an afocal lens or a monofocal corrective lens, the untinted zone or the grey or brown-coloured zone is situated overall in the lower half of the lens. This colourless or neutral-coloured zone can extend as far as the edge of the lens or a thin red or orange-coloured zone can remain at the lower edge of such a lens. The colourless or neutral-coloured zone, situated in the lower half of the lens, preferably has a shape such that it is delimited towards the top by an inverted parabola.

This inverted parabola is preferably a parabola corresponding to the following equation:

$$y = -ax^2 - b, \quad (1)$$

where the value of a is comprised between 0.01 and 0.03, preferably between 0.015 and 0.025, and b (=value of the ordinate at the origin) is comprised between 5 and 10 mm. The origin of the Cartesian reference frame in which the inverted parabola defined by equation (1) is inscribed, is superimposed on the optical centre of the lens when it is a monofocal lens, or on the geometric centre when it is an afocal lens.

Figure 4:
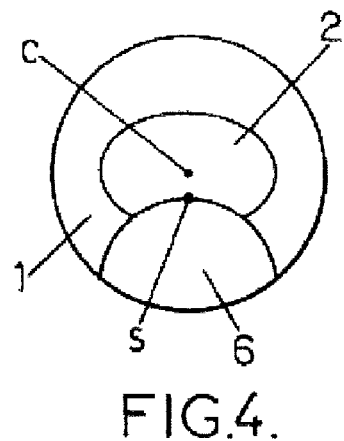
FIG. 4 is another embodiment of a monofocal ophthalmic lens.

FIG. 4 illustrates such a colourless zone in the lower part of a lens, the contour of which has the shape of an inverted parabola. The lens is a monofocal lens with an optical centre C situated in a central yellow zone 2, surrounded by a red or orange peripheral zone 1, adjacent to the yellow zone, and a colourless zone 6 extending as far as the lower edge of the lens. The distance between the top S of the parabola and the optical centre C corresponds to the value of the ordinate at the origin b of equation (1) above.

Figure 5:
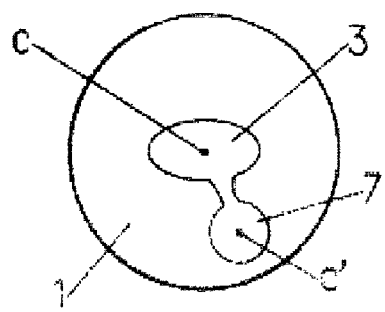
FIG. 5 is another embodiment of a progressive corrective ophthalmic lens.

When the lens according to the invention is a progressive lens with a far vision optical centre and a close vision centre, the untinted or grey or brown-coloured zone preferably covers essentially the zone around the close vision optical centre. This embodiment is illustrated in FIG. 5 which shows an ophthalmic lens with a yellow-coloured oval zone 3 corresponding to the zone centred around the far vision optical centre C, a colourless circular zone 7 centred around the close vision optical centre C', and a red or orange-coloured zone 1 covering the remainder of the surface of the lens.

The use of the yellow, red or orange and optionally grey or brown colourations on appropriate supports made of mineral or organic glass with a view to producing an ophthalmic lens according to the invention can be done for example by sublimation and/or by inkjet printing. These techniques are described for example in the patent applications WO 2006/079564 and FR 2 881 230 in the name of the applicant. It is also possible to envisage the use on a substrate of a pixelated film combined with inkjet printing technology as described in the patent application WO 2006/013250.

The present invention will be better understood on reading the following examples which illustrate the subject of the invention in a non-limitative manner.

EXAMPLE 1

Colouration of Ophthalmic Lenses According to the Invention by Inkjet Printing 40% by weight of anionic polyurethane (W234 marketed by Baxenden) is mixed under magnetic stirring with 60% by weight colloidal silica (Ludox TM40 marketed by Aldrich). After stirring for one hour, the mixture obtained by centrifugation (spin coating) is applied to an Orma™ biplane substrate (500 revolutions/20 seconds). The deposit is dried for 1 hour at 100° C. in an oven. The thickness of the primer thus obtained is 3.6 μm. After drying, the optical lens comprising the primer and the substrate can be printed with a Canon i865 printer. The yellow, red or orange and optionally grey zones are drawn using Powerpoint™ software. The ophthalmic lens is introduced into the loading module of the printer, the latter being connected to the computer comprising the file "coloured zones" in Powerpoint™. The printing is carried out. When the lens leaves the printer, it is immediately dried for 1 hour at 100° C. An ophthalmic lens with filters of the desired colours is obtained.

The invention claimed is:

1. An ophthalmic lens, comprising, on its surface,
   a yellow-coloured central zone, wherein the blue light of the visible spectrum is absorbed, and
   a red or orange-coloured peripheral zone, light of wavelengths less than 600 nm is absorbed.

2. The ophthalmic lens according to claim 1, which is an afocal ophthalmic lens and wherein the yellow-colored central zone is circular or oval in shape.

3. The ophthalmic lens according to claim 1, which is a monofocal corrective ophthalmic lens and wherein the yellow-colored central zone is circular or oval in shape, and is centered on the optical centre (C) of the lens.

4. The ophthalmic lens according to claim 2 wherein the diameter or the largest dimension of the central zone is comprised between 5 and 35 mm.

5. The ophthalmic lens according to claim 1, which is a progressive corrective ophthalmic lens with a far vision optical centre (C) and a near vision optical centre (C'), and wherein the yellow-colored central zone essentially covers the zone around the far vision optical centre and the zone around the near vision optical centre, as well as a band linking these two zones and corresponding to the path followed by the eye when it passes from one to the other.

6. The ophthalmic lens according to claim 5, wherein the diameter or the largest dimension of the yellow-colored central zone covering the far vision optical centre is comprised between 5 and 35 mm, the diameter or the largest dimension of the yellow-colored zone covering the near vision optical centre is comprised between 5 and 15 mm, and the width of the band linking these two zones is comprised between 3 and 7 mm.

7. The ophthalmic lens according to claim 1, wherein the red or orange-colored peripheral zone covers the entire surface of said ophthalmic lens not covered by the yellow-colored zone.

8. The ophthalmic lens according to claim 1, further comprising an untinted zone or neutral-tinted zone in at least in one part of the zone explored by the eye in close vision.

9. The ophthalmic lens according to claim 8, which is an afocal lens or a monofocal corrective lens, and wherein the untinted zone or the neutral-tinted zone is a zone located in the lower half of the lens and delimited towards the top by an inverted parabola.

10. The ophthalmic lens according to claim 9, characterized by the fact that the untinted or neutral-tinted zone is delimited by a parabola corresponding to the equation $$y=-ax^2-b,$$

where the value of a is comprised between 0.01 and 0.03, and b is comprised between 5 and 10 mm, the origin of the Cartesian reference frame corresponding to the optical or geometric centre of the lens.

11. The ophthalmic lens according to claim 8, which is a progressive lens and wherein the untinted or neutral-tinted zone essentially covers the zone around the close vision optical centre.

12. The ophthalmic lens according to claim 8, wherein the neutral-tinted zone is formed having a brown or grey colour.

* * * * *